United States Patent
Iwasaki

(10) Patent No.: US 9,467,618 B2
(45) Date of Patent: Oct. 11, 2016

(54) IMAGE PICKUP APPARATUS AND IMAGING METHOD

(71) Applicant: CANON KABUSHIKI KAISHA, Tokyo (JP)

(72) Inventor: Naoki Iwasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/795,651

(22) Filed: Jul. 9, 2015

(65) Prior Publication Data

US 2016/0021297 A1    Jan. 21, 2016

(30) Foreign Application Priority Data

Jul. 15, 2014 (JP) .................. 2014-145279

(51) Int. Cl.
H04N 5/232 (2006.01)

(52) U.S. Cl.
CPC ...... H04N 5/23212 (2013.01); H04N 5/23251 (2013.01)

(58) Field of Classification Search
CPC ................................. H04N 5/23212
See application file for complete search history.

(56) References Cited

U.S. PATENT DOCUMENTS

| 2005/0185083 A1* | 8/2005 | Okawara | H04N 5/23212 348/345 |
| 2011/0149141 A1* | 6/2011 | Yasuda | H04N 5/23212 348/345 |
| 2013/0182127 A1* | 7/2013 | Yasuda | H04N 5/23212 348/207.1 |

FOREIGN PATENT DOCUMENTS

JP    2014-038197 A    2/2014

\* cited by examiner

*Primary Examiner* — Paul Berardesca
(74) *Attorney, Agent, or Firm* — Canon U.S.A. Inc., IP Division

(57) ABSTRACT

An image pickup apparatus is configured such that if a monitoring unit detects that a focus evaluation value changes as much as or more than a predetermined threshold, a monitoring state caused by the monitoring unit transitions to a focus adjustment state by minute driving. The predetermined threshold in the monitoring performed in an in-focus position obtained by hill-climbing driving is greater than the predetermined threshold in the monitoring performed in an in-focus position obtained by the minute driving.

7 Claims, 11 Drawing Sheets

FIG.9A
GENTLE CHANGE

FIG.9B
SHARP CHANGE

IMAGE PICKUP APPARATUS AND IMAGING METHOD

BACKGROUND OF THE INVENTION

1. Field of the Invention

The present invention relates to an image pickup apparatus and an imaging method, and more particularly to a technique related to automatic focusing (AF) used in a digital still camera, a digital video camera, and the like.

2. Description of the Related Art

Conventional automatic focusing apparatuses mainly use a method for controlling a focusing lens position to maximize an automatic focusing (AF) evaluation value for focus adjustment. The AF evaluation value is obtained by photoelectrically converting an object image into a video signal by an image sensor and detecting screen sharpness from the video signal.

The level of a high-frequency component of the video signal extracted by a band-pass filter having a certain band is usually used as the AF evaluation value. When capturing a normal object image, the level of the AF evaluation value increases as the object image comes into focus. A point that maximizes the level is an in-focus position.

If the captured scene does not change, the focusing lens is subsequently stopped to enter a state of monitoring the AF evaluation value and brightness (hereinafter, a monitoring state). In the monitoring state, the AF evaluation value is calculated based on the video signal. If an object leaves or enters the screen, the AF evaluation value thus changes and it is determined that the scene has changed. As a result, the automatic focusing apparatus may come into an operation for searching for an in-focus position (Japanese Patent Application Laid-Open No. 2014-38197).

Performing a focus adjustment by using a plurality of different focus adjustment methods, such as a minute driving operation and a hill-climbing operation, is known.

The minute driving operation is an operation for reciprocating the focusing lens by a unit movement amount smaller than a predetermined value in an intermittent manner to obtain an AF evaluation value, and controlling the focusing lens in a direction in which the AF evaluation value increases.

The hill-climbing operation is an operation for obtaining AF evaluation values while moving the focusing lens in a specific direction in a unit movement amount greater than the predetermined value, and identifying an in-focus position from the configuration of the plurality of AF evaluation values.

If there is a scene change as described above, the minute driving operation is initially performed to identify an in-focus position and a direction of the in-focus position.

However, suppose that an object moves out of the screen during the identification of the in-focus position. If the background contrast is low, it takes a long time to identify the in-focus position and the direction thereof since a change in the AF evaluation value is difficult to detect.

In such a case, the minute driving operation transitions to the hill-climbing operation along the way to search a wider range for an in-focus position. However, as a result of the foregoing determination of a scene change, the focusing lens may stop at a position other than an originally expected in-focus position. Or tracking to the in-focus position may become unstable and visually undesirable.

SUMMARY OF THE INVENTION

The present invention is directed to an image pickup apparatus and an imaging method that can achieve stable focus tracking even if an object leaves or enters the screen and an AF evaluation value does not show an expected change tendency.

According to an aspect of the present invention, an image pickup apparatus includes an image sensor, a focus evaluation value calculation unit configured to extract a specific frequency component from an image signal output from the image sensor and calculate a focus evaluation value indicating contrast of the image signal, a first focus adjustment unit configured to reciprocate a focusing lens by a unit movement amount smaller than a predetermined value and perform a focus adjustment based on a change in the focus evaluation value, a second focus adjustment unit configured to, after the focus adjustment by the first focus adjustment unit, move the focusing lens in a direction which increases the focus evaluation value by a unit movement amount greater than or equal to the predetermined value and perform a focus adjustment based on a change in the focus evaluation value, a monitoring unit configured to monitor whether the focus evaluation value changes as much as or more than a predetermined threshold in an in-focus position obtained by either one of the first focus adjustment unit and the second focus adjustment unit, and a control unit configured to, if the focus evaluation value changes as much as or more than the predetermined threshold and a monitoring state caused by the monitoring unit transitions to a focus adjustment state, control the predetermined threshold in monitoring performed in the in-focus position obtained by using the second focus adjustment unit so that the predetermined threshold becomes greater than the predetermined threshold in monitoring performed in the in-focus position obtained by the first focus adjustment unit without using the second focus adjustment unit.

Further features of the present invention will become apparent from the following description of exemplary embodiments with reference to the attached drawings.

BRIEF DESCRIPTION OF THE DRAWINGS

Figures 9A, 9B:
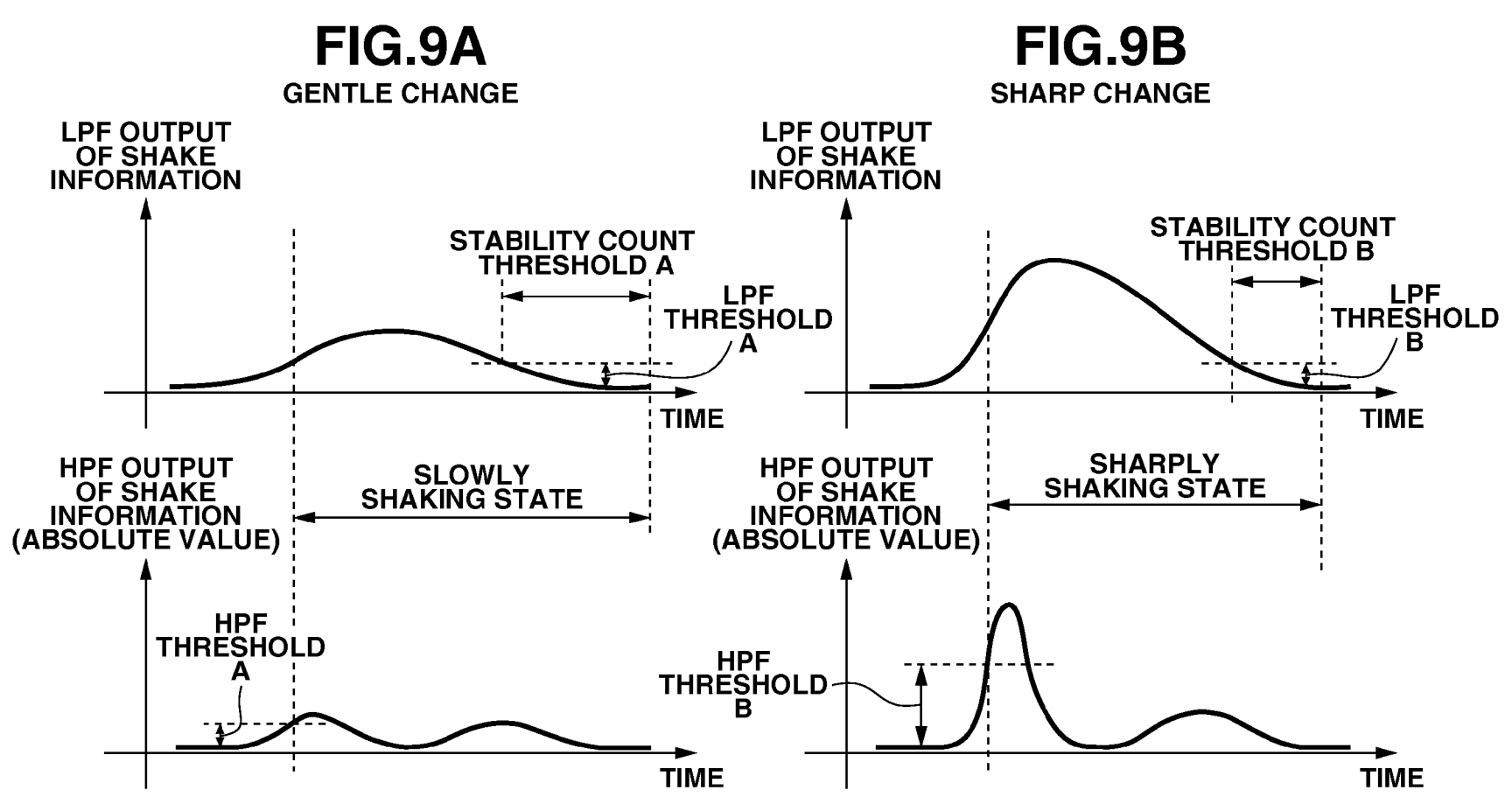

FIGS. 9A and 9B are explanatory diagrams illustrating a tendency of change in shake information based on a shaking state.

DESCRIPTION OF THE EMBODIMENTS

An exemplary embodiment of the present invention will be described in detail below with reference to the drawings.

Figure 1:
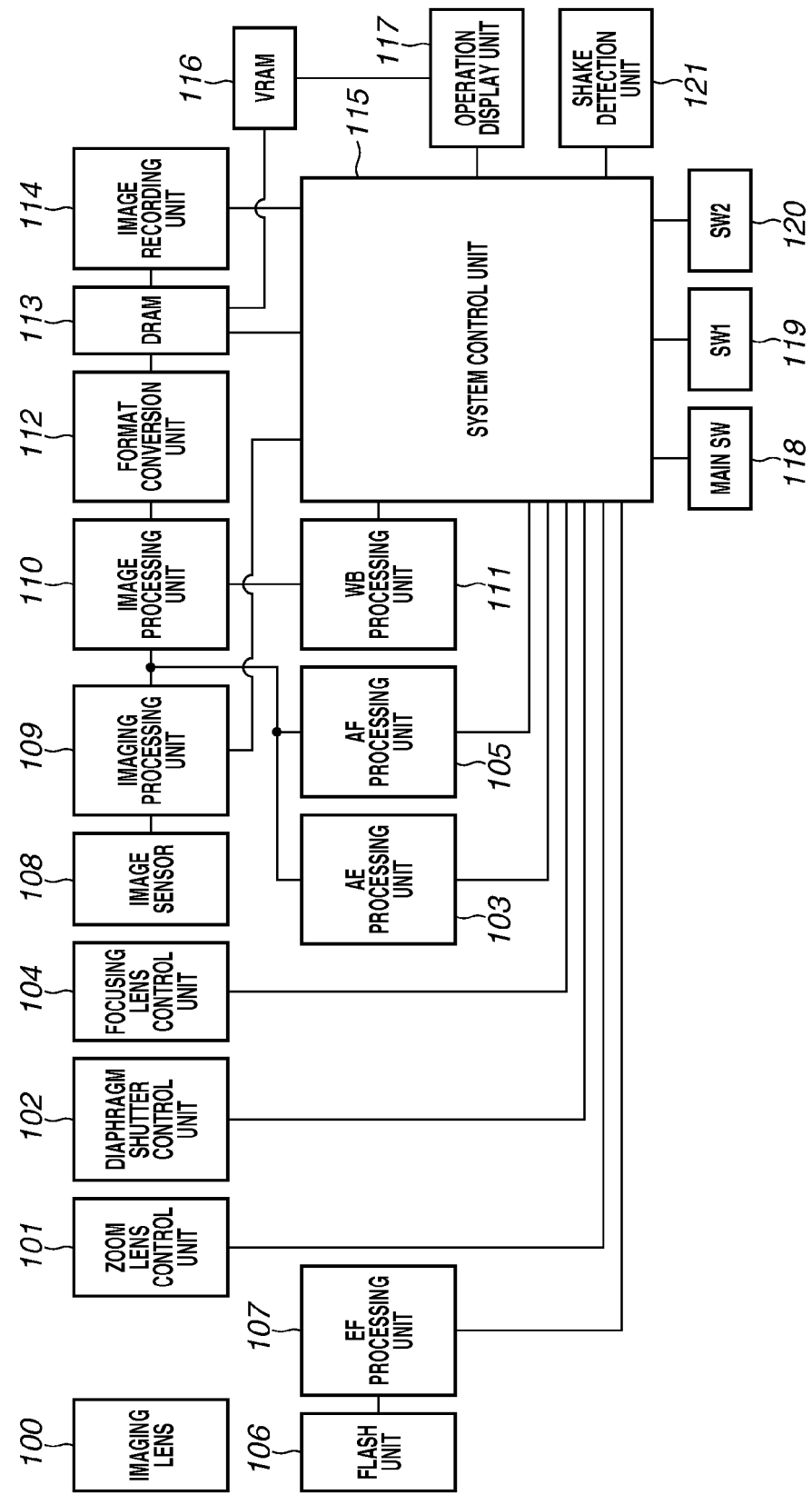
FIG. 1 is a block diagram illustrating a configuration of an entire system of an image pickup apparatus.

An overall configuration of an image pickup apparatus 1 having a moving image capturing function according to the exemplary embodiment of the present invention will initially be described. FIG. 1 is a block diagram schematically illustrating the configuration of the image pickup apparatus 1 according to the exemplary embodiment of the present invention. A system control unit 115 includes, for example, a central processing unit (CPU), a random access memory (RAM), and a read-only memory (ROM) (not illustrated).

The system control unit 115 controls operations of the entire image pickup apparatus 1, for example, by executing a program stored in the ROM and by using the RAM as a work area. Each process to be described below is mainly executed by the system control unit 115 in operative cooperation with hardware elements connected thereto, by executing a computer program (software) specifically designed to perform each process or operation.

The system control unit 115 identifies an in-focus position based on a focus evaluation value calculated by an AF processing unit 105, and controls a focusing lens control unit 104 which moves a focusing lens to perform automatic focus adjustment (AF) processing. The focus evaluation value is a numerical value serving as an index of contrast in a range-finding area of an image.

A conventional typical imaging lens having a zoom function may be applied to an imaging lens 100. A zoom lens control unit 101 controls driving of a zoom lens which changes a focal length. A diaphragm shutter control unit 102 controls driving of a diaphragm and a shutter (not shown) which control a light amount.

The focusing lens control unit 104 controls driving of the focusing lens to focus on an image sensor 108. The zoom lens control unit 101, the diaphragm shutter control unit 102, and the focusing lens control unit 104 include optical elements such as a lens, mechanisms such as a diaphragm and a shutter, and various devices which are necessary to drive the optical elements and mechanisms (all of which are omitted from the drawings).

The various devices include actuators for driving the optical elements and the mechanisms, circuits for controlling the actuators, and a digital-to-analog (D/A) converter. A light emitting device (flash unit) 106 emits light to adjust object brightness.

If an electronic flash (EF) processing unit 107 receives a "flash on" signal from the system control unit 115, the EF processing unit 107 controls the light emitting device (flash unit) 106 to emit light. The system control unit 115 transmits the "flash on" signal to the EF processing unit 107 if it is determined that the light emitting device (flash unit) 106 needs to emit light.

A light receiving unit or a photoelectric conversion unit for converting incident light into an electrical signal is used as the image sensor 108. For example, the image sensor 108 includes a photoelectric conversion element such as a charge-coupled device (CCD) and a complementary metal-oxide-semiconductor (CMOS) imager. The image sensor 108 can photoelectrically convert incident light to generate and output an image signal (image signal).

An imaging processing unit 109 includes a correlated double sampling (CDS) circuit, a nonlinear amplification circuit, and an analog-to-digital (A/D) conversion unit. The CDS circuit removes output noise of the image sensor 108 by a correlated double sampling method. The nonlinear amplification circuit performs signal amplification (gain control) on the image signal of which the noise is removed by the CDS circuit.

The A/D conversion unit converts the image signal, which is an analog signal, into a digital signal. The image sensor 108 and the imaging processing unit 109 function as an "imaging unit" that captures an image of an object to obtain the image signal.

An image processing unit 110 performs predetermined image processing such as gamma correction and contour correction of the image signal (i.e., image data). The image processing unit 110 further performs white balance processing on the image signal under control of a white balance (WB) processing unit 111.

A format conversion unit 112 converts the supplied image signal into a format suited for recording on a recording medium by an image recording unit 114 (to be described below) or displaying by an operation display unit 117 (to be described below). A dynamic random access memory (DRAM) 113 is a high-speed built-in memory (such as a random access memory).

The DRAM 113 is used as a high-speed buffer serving as a storage unit in which the image signal can be temporarily stored. The DRAM 113 is also used as a working memory when the image signal is compressed or decompressed.

The image recording unit 114 can record the image signal. The image recording unit 114 includes a recording medium such as a memory card, and its interface.

An automatic exposure (AE) processing unit 103 calculates a light metering value according to the brightness of the object based on the image signal obtained by the imaging unit (the image sensor 108 and the imaging processing unit 109). In other words, the AE processing unit 103 and the imaging processing unit 109 function as an "exposure condition detection unit" that detects an exposure condition at the time of imaging the object.

The AE processing unit 103 determines a signal amplification amount (gain amount) for amplifying the image signal to maintain a correct exposure if the object brightness is low. In other words, the AE processing unit 103 determines the signal amplification amount (gain amount) for correcting the image signal to show a correct exposure.

The system control unit 115 controls the diaphragm shutter control unit 102 and the nonlinear amplification circuit of the imaging processing unit 109 based on the light metering value calculated by the AE processing unit 103. In such a manner, the system control unit 115 automatically adjusts an exposure amount. In other words, the system control unit 115 performs AE processing by using the exposure condition detected by the "exposure condition detection unit."

Figure 10:
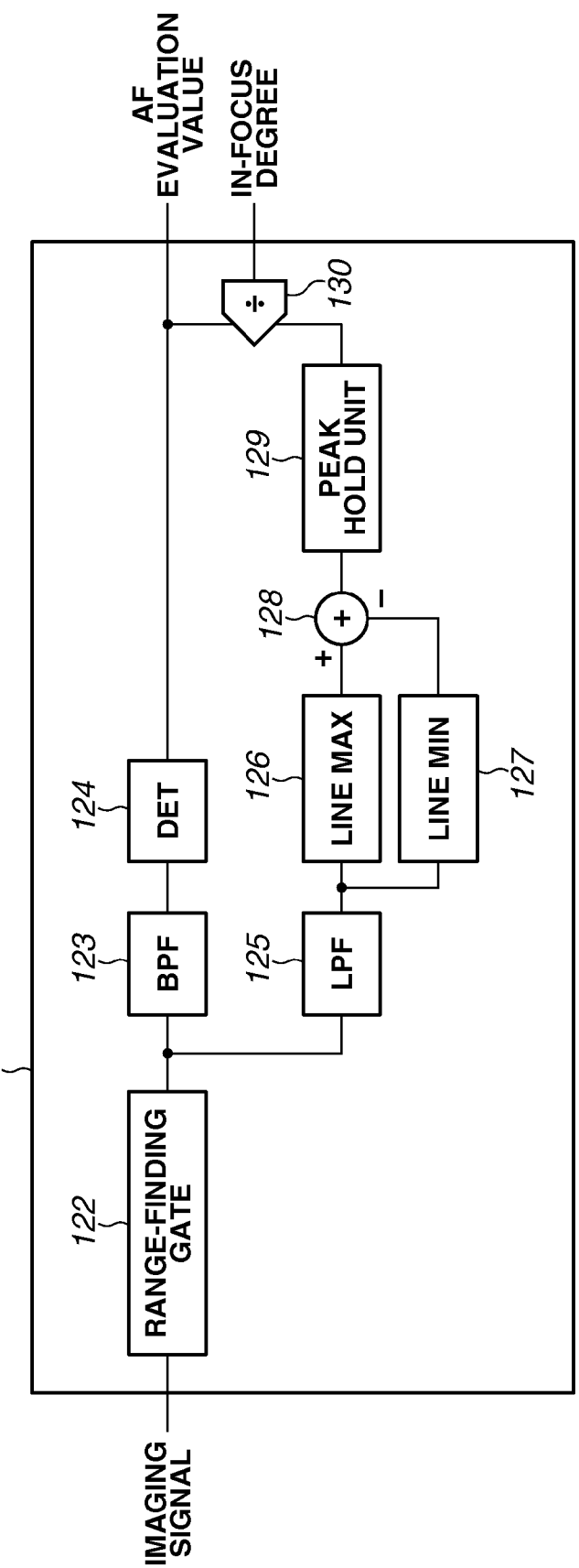
FIG. 10 is a block diagram illustrating a configuration of an AF processing unit.

The system control unit 115 controls the focusing lens control unit 104 to perform the automatic focus adjustment (AF) processing based on an AF evaluation value obtained by the AF processing unit 105. FIG. 10 illustrates details of the AF processing unit 105. A range-finding gate 122 extracts an image signal of only a part of a screen from the image signal obtained by the imaging processing unit 109. A band-pass filter (BPF) 123 extracts only a predetermined high-frequency component. A detection unit (DET) 124 performs processing such as peak hold processing and integration processing. In the present exemplary embodiment, an output of the integration processing is used as the AF evaluation value.

The AF processing unit 105 functions as an evaluation value calculation unit that extracts a specific frequency component from the image signal output from the image sensor 108 by using a signal of a specific area of the image, and calculates the focus evaluation value indicating contrast of the image signal.

The AF processing unit 105 further calculates an in-focus level of the image signal.

A low-pass filter (LPF) 125 removes high-frequency components from the image signal which has passed through the range-finding gate 122.

A line maximum value unit (line max) 126 detects a maximum value of one horizontal line of the image signal. A line minimum value unit (line min) 127 detects a minimum value of one horizontal line of the image signal.

An addition unit 128 calculates a difference between the maximum value and the minimum value of one horizontal line of the image signal (i.e., the maximum value–the minimum value). A peak hold unit 129 detects a peak value MM of (the maximum value–the minimum value) of all the lines in the range-finding gate 122. The peak value MM substantially corresponds to the maximum value of contrast in the range-finding gate 122.

A division unit 130 calculates the in-focus level by dividing a peak hold value of the band-pass filter 123 detected by the detection unit 124 of the image signal extracted by the range-finding gate 122, by the peak value MM. The AF evaluation value is an integral output and is thus robust against the effect of noise. However, the AF evaluation value in the in-focus position can vary greatly depending on the type of the object and an imaging condition (such as object brightness, luminance, and focal length) (FIG. 11A).

Figures 11A, 11B:
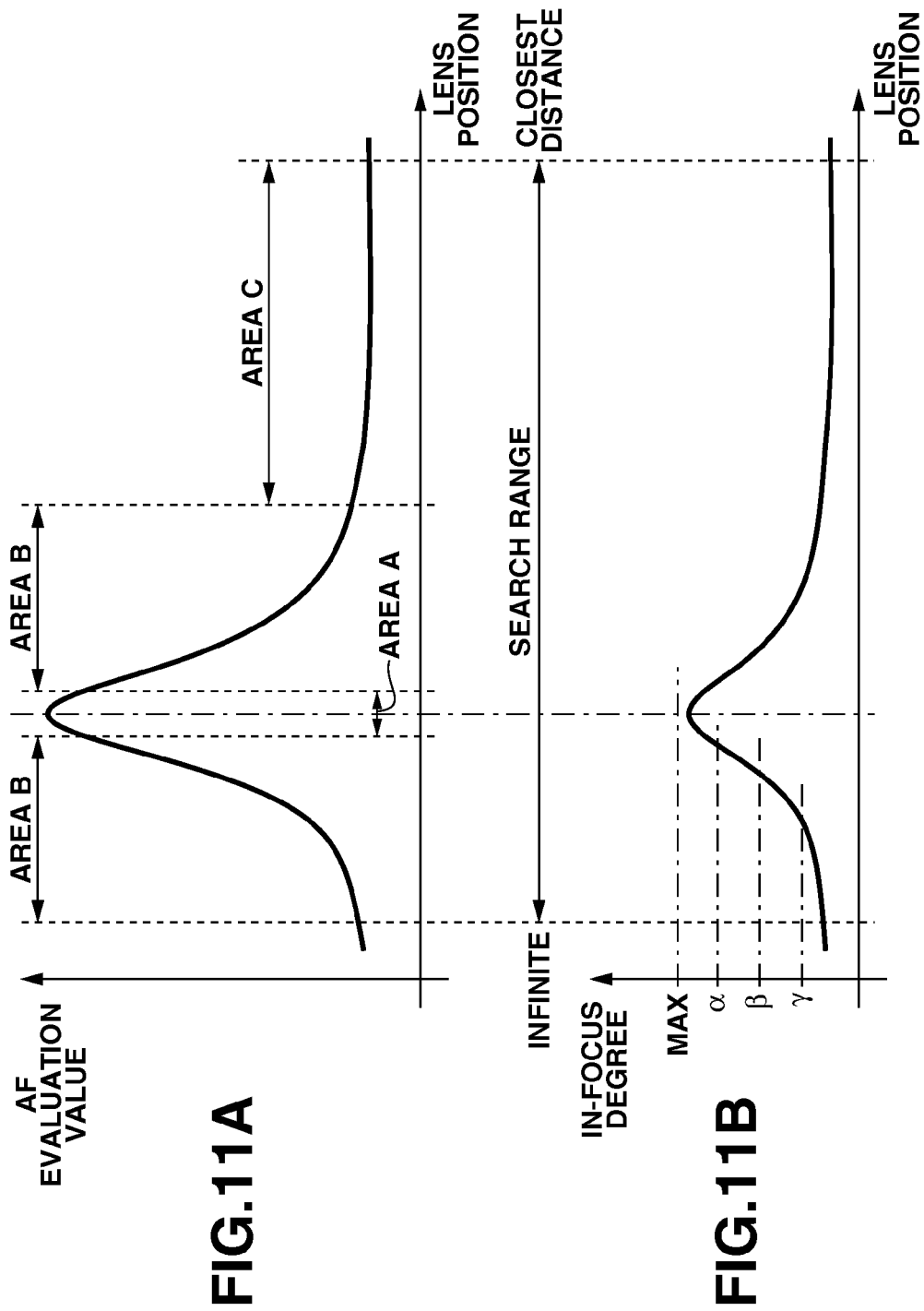
FIGS. 11A and 11B are explanatory diagrams illustrating a relationship between the AF evaluation value and a lens position.

When the in-focus level is normalized, the in-focus level approaches a certain value (Max in FIG. 11B) in the in-focus position, and tends to decrease in value as the image signal defocuses (FIG. 11B). In the present exemplary embodiment, the characteristics of the AF evaluation value and the in-focus level are used to perform the automatic focus adjustment processing.

A video random access memory (VRAM) (image display memory) 116 can record the image signal. The operation display unit 117 can provide an image display, an operation-assisting display, and a display of a camera state. The operation display unit 117 can display an imaging screen during imaging. A main switch (main SW) 118 powers on/off the image pickup apparatus 1 according to the exemplary embodiment of the present invention.

A first switch (SW1) 119 is used when an imaging standby operation (imaging preparation operation) such as AF and AE is performed. A second switch (SW2) 120 is used when imaging is performed after the operation of the first switch 119.

A shake detection unit 121 is an angular velocity sensor such as a vibrating gyroscope. The system control unit 115 detects a shake amount based on a sensor output of the shake detection unit 121. In the present exemplary embodiment, an angular velocity sensor such as a vibrating gyroscope is used for a shake detection method, however, a motion vector detection method for detecting an image without a sensor may be employed.

Next, an overall flow of a focus adjustment operation according to the present exemplary embodiment will be described with reference to the flowchart of FIG. 2.

The focus adjustment operation in the present exemplary embodiment is continuously performed during moving image recording and during standby. Processing of the flowcharts according to the present exemplary embodiment are stored as a computer program (software) in the ROM of the system control unit 115.

The user operates the main switch 118 to power on and activate the image pickup apparatus 1 according to the exemplary embodiment of the present invention. The focus adjustment operation is then executed mainly by the system control unit 115.

In step S200, the system control unit 115 performs stability monitoring processing. The stability monitoring processing is processing for determining a shake state caused by the operator operating the image pickup apparatus 1, such as a camera shake and panning, and if the focus adjustment operation is determined to be unable to be appropriately performed on the shake state, monitoring the shake state is performed until it becomes stabilized.

The stability monitoring processing will be described in detail below. In step S201, the system control unit 115 determines whether the next state to transition is a minute driving operation as a result of the stability monitoring processing of step S200. In step S201, if the next state is the minute driving operation (YES in step S201), the processing proceeds to step S202.

If the next state is not the minute driving operation (NO in step S201), the processing returns to step S200. In step S200, the system control unit 115 continues monitoring the shake state waiting for stabilization.

In step S202, the system control unit 115 performs the minute driving operation. The minute driving operation refers to a focus adjustment method, by minutely moving the focusing lens in an intermittent manner, to identify an in-focus position and a direction of an in-focus position based on a change in the obtained AF evaluation value. The minute driving operation will be described in detail below. In steps S203, S204, and S205, the system control unit 115 determines a state to transition next as a result of execution of step S202.

Specifically, in step S203, the system control unit 115 determines whether to transition to the foregoing stability monitoring processing. In step S204, the system control unit 115 determines whether to transition to monitoring processing of the AF evaluation value (described below). In step S205, the system control unit 115 determines whether to transition to a hill-climbing operation (described below). In step S203, if the system control unit 115 determines to transition to the stability monitoring processing (YES in step S203), the processing returns to step S200.

In step S204, if the system control unit 115 determines to transition to the monitoring processing of the AF evaluation value (YES in step S204), the processing proceeds to step S210. In step S210, the system control unit 115 stores the AF evaluation value at the in-focus position identified in step S202 or at an out-of-focus lens position where the minute driving processing is suspended. The stored AF evaluation value is used in the monitoring processing of the AF evaluation value to be described below.

In step S205, if the system control unit 115 determines to transition to the hill-climbing operation (YES in step S205), the processing proceeds to step S206. If not (NO in step S205), the processing returns to step S202. In step S202, the system control unit 115 continues the minute driving operation.

In step S206, the system control unit 115 performs the hill-climbing operation. The hill-climbing operation refers to a focus adjustment method for continuously moving the focusing lens and identifying the in-focus position based on a change of a plurality of AF evaluation values obtained. The hill-climbing operation will be described in detail below.

In steps S207, S208, and S209, the system control unit 115 determines a state to transition next, as a result of execution of step S206. Specifically, in step S207, the system control unit 115 determines whether to transition to the foregoing stability monitoring processing. In step S208, the system control unit 115 determines whether to transition to the foregoing minute driving operation. In step S209, the system control unit 115 determines whether to transition to the monitoring processing of the AF evaluation value.

In step S207, if the system control unit 115 determines to transition to the stability monitoring processing (YES in step S207), the processing returns to the foregoing step S200. In step S208, if the system control unit 115 determines to transition to the minute driving operation (YES in step S208), the processing returns to the foregoing step S202.

In step S209, if the system control unit 115 determines to transition to the monitoring processing of the AF evaluation value, the processing proceeds to step S210. In step S210, the system control unit 115 stores the AF evaluation value at an out-of-focus lens position where the hill-climbing operation is suspended in step S206. The stored AF evaluation value is used in the monitoring processing of the AF evaluation value to be described below. If not (NO in step S209), the processing returns to step S206. In step S206, the system control unit 115 continues the hill-climbing operation.

Next, the monitoring processing of the AF evaluation value in step S211 will be described. The monitoring processing of the AF evaluation value is processing for comparing a previously-stored AF evaluation value with a periodically-obtained AF evaluation value to monitor a change in the AF evaluation value. Details will be described below.

In steps S212 and S213, the system control unit 115 determines a next state to transition to, as a result of execution of step S211. In step S212, if the system control unit 115 determines to transition to the minute driving operation (YES in step S212), the processing returns to the foregoing step S202. In step S213, if the system control unit 115 determines to transition to the stability monitoring processing (YES in step S213), the processing returns to the foregoing step S200.

If not (NO in step S213), the processing returns to step S211. In step S211, the system control unit 115 continues the monitoring processing of the AF evaluation value.

As described above, the system control unit 115 of the image pickup apparatus 1 according to the exemplary embodiment of the present invention continuously performs the minute driving operation, the hill-climbing operation, which are described above as AF operations, the monitoring of the AF evaluation value, and the stability monitoring. The system control unit 115 then controls the focusing lens to maintain the in-focus state according to scene changes.

Next, the minute driving operation will be described with reference to the flowchart of FIG. 3.

The minute driving operation refers to a focus adjustment method, for minutely moving the focusing lens in an intermittent manner, to identify the in-focus position and the direction of the in-focus position based on a change in the obtained AF evaluation value.

In other words, the minute driving operation is an operation for reciprocating the focusing lens by a unit movement amount smaller than a predetermined value and performing focus detection based on a change in the focus evaluation value. A unit that performs the minute driving operation is referred to as a first focus adjustment unit.

In step S300, the system control unit 115 obtains the AF evaluation value from the AF processing unit 105. In step S301, the system control unit 115 obtains the in-focus level. In step S302, the system control unit 115 determines a movement amount of minute driving.

In the present exemplary embodiment, the closer to the in-focus position, the smaller the amount by which the focusing lens moves, and the farther the in-focus position, the greater the amount by which the focusing lens moves. In such a manner, the system control unit 115 achieves stable focus tracking by the minute driving operation.

For that purpose, the system control unit 115 determines the movement amount of the focusing lens according to the in-focus level obtained in step S301. For example, if thresholds $\alpha$, $\beta$, and $\gamma$ of the in-focus level are set to have a relation of $\alpha > \beta > \gamma$ as illustrated in FIG. 11B, the corresponding movement amounts have the following relation.

If the current in-focus level is higher than a, the movement amount is step 1.

If the current in-focus level is higher than $\beta$ and lower than or equal to $\alpha$, the movement amount is step 2. If the current in-focus level is higher than $\gamma$ and lower than or equal to $\beta$, the movement amount is step 3. If the current in-focus level is lower than or equal to $\gamma$, the movement amount is step 4.

(Step 1<Step 2<Step 3<Step 4)

In step S303, the system control unit 115 determines whether the current AF evaluation value is greater than (the previous AF evaluation value+a change threshold A). The change threshold A is a threshold for determining that the AF evaluation value has clearly increased. The change threshold A is set in consideration of the actual amount of increase of the AF evaluation value and variations due to noise components.

In step S303, if the condition is satisfied and a tendency of the AF evaluation value to increase is detected (YES in step S303), the processing proceeds to step S304. In step S304, the system control unit 115 increases a direction identification counter. The direction identification counter is used when identifying the direction of the in-focus position. The direction identification counter indicates that the greater the value of the counter becomes, the more stably the AF evaluation value increases toward the in-focus position.

In step S305, the system control unit 115 moves the focusing lens from the current position by the movement amount determined in step S302. The direction of the movement is the same as the previous direction. In step S303, if the AF evaluation value does not satisfy the condition (NO in step S303), the processing proceeds to step S306.

In step S306, the system control unit 115 determines whether the current AF evaluation value is larger than (the previous AF evaluation value−the change threshold A). The system control unit 115 here detects a tendency of the AF evaluation value to decrease, as opposed to step S303. If the condition is satisfied (YES in step S306), the processing proceeds to step S308. In step S308, the system control unit 115 clears the direction identification counter.

In step S309, the system control unit 115 moves the focusing lens from the current position in a direction opposite to the previous direction by the movement amount determined in step S302. In step S306, if the condition is not satisfied (NO in step S306), the processing proceeds to step S307. In step S307, the system control unit 115 moves the focusing lens from the current position in the same direction as the previous direction by the movement amount determined in step S302.

In such a case, the system control unit 115 does not operate the direction identification counter since an explicit increase or decrease of the AF evaluation value is not detectable. In step S310, the system control unit 115 determines whether the focusing lens has reciprocated in the same area a predetermined number of times. For example, suppose that the focusing lens has been converged to near the in-focus position like an area A in FIG. 11A. If the focusing lens passes the in-focus position by the minute driving operation, the AF evaluation value decreases and the direction of movement is reversed at the next control timing.

If such an operation continues, the focusing lens eventually reciprocates across the in-focus position. Then, if the focusing lens has reciprocated in the same area a predetermined number of times (YES in step S310), the processing proceeds to step S316. In step S316, the system control unit 115 determines that the focusing lens is "in focus." If such a determination is made, the system control unit 115 sets the next state to the monitoring processing of the AF evaluation value.

If the condition is determined to be not satisfied (NO in step S310), the processing proceeds to step S311. In step S311, the system control unit 115 determines whether the direction identification counter is greater than or equal to a predetermined value. If the direction identification counter is greater than or equal to a predetermined value (YES in step S311), the processing proceeds to step S315. In step S315, the system control unit 115 determines it as "direction identification." If such a determination is made, the system control unit 115 sets the next state to the hill-climbing operation.

If the condition is determined to be not satisfied (NO in step S311), the processing proceeds to step S312. In step S312, the system control unit 115 determines whether the processing of the series of minute driving operations has been performed a predetermined number of times and whether the in-focus level obtained in step S301 is lower than a predetermined threshold. For example, in situations where the AF evaluation value hardly changes, like the area C of FIG. 11A, the in-focus position or the direction thereof may not be identified within the predetermined number of times.

It may be because the search range is wide and the current position is too far from the in-focus position, or the actual in-focus position lies outside the search range. In such cases, the in-focus position and the direction thereof are difficult to find even if the minute driving operation continues. If so (YES in step S312), the processing proceeds to step S314. In step S314, the system control unit 115 determines that the focusing lens is "not in focus." If such a determination is made, the system control unit 115 sets the next state to the hill-climbing operation.

If the condition is determined to be not satisfied (NO in step S312), the processing proceeds to step S313. In step S313, the system control unit 115 determines to continue the minute driving operation. If such a determination is made, the system control unit 115 continues to perform the minute driving operation without setting the next state.

In the processing of steps S310 to S316, the system control unit 115 detects a change in the periodically-obtained AF evaluation value and outputs a determination result of the minute driving operation based on the change. In step S317, the system control unit 115 performs processing for determining a focus adjustment method based on the determination result. Details will be described below.

The minute driving operation of the image pickup apparatus 1 according to the exemplary embodiment of the present invention has been described above.

Next, the hill-climbing operation will be described with reference to the flowchart of FIG. 4.

The hill-climbing operation refers to a focus adjustment method by continuously moving the focusing lens to identify the in-focus position based on a change of a plurality of AF evaluation values obtained.

In other words, the hill-climbing operation is an operation for moving the focusing lens in a direction where the focus evaluation value increases by unit movement amounts greater than or equal to a predetermined value and performing focus detection based on a change in the focus evaluation value.

The hill-climbing operation is performed by a second focus adjustment unit.

In step S400, the second focus adjustment unit obtains the AF evaluation value and the corresponding focusing lens position. In step S401, the second focus adjustment unit obtains the in-focus level. In step S402, the second focus adjustment unit determines a moving speed of the focusing lens in the hill-climbing operation.

In the present exemplary embodiment, the closer to the in-focus position, the slower the focusing lens moves. The farther from the in-focus position, the faster the focusing lens moves. In such a manner, the second focus adjustment unit achieves stable focus tracking by the hill-climbing operation.

For that purpose, the second focus adjustment unit determines the moving speed of the focusing lens according to the in-focus level obtained in step S401. For example, if the thresholds $\alpha$, $\beta$, and $\gamma$ of the in-focus level are set to have the relation of $\alpha > \beta > \gamma$ as illustrated in FIG. 11B, the corresponding moving speeds have the following relation.

If the current in-focus level is higher than $\alpha$, the moving speed of the focusing lens is speed 1.

If the current in-focus level is higher than $\beta$ and lower than or equal to $\alpha$, the moving speed of the focusing lens is speed 2.

If the current in-focus level is higher than $\gamma$ and lower than or equal to $\beta$, the moving speed of the focusing lens is speed 3.

If the current in-focus level is lower than or equal to $\gamma$, the moving speed of the focusing lens is speed 4.

(Speed 1<Speed 2<Speed 3<Speed 4).

In step S403, the second focus adjustment unit determines whether the focusing lens is at rest.

The focusing lens is at rest either immediately after the minute driving operation transitions to the hill-climbing operation or when the focusing lens reaches an end of the search range during the hill-climbing operation.

In step S405, the second focus adjustment unit thus determines whether the current lens position is at the end. In step S405, if the current lens position is determined to be at the end (YES in step S405), the processing proceeds to step S407. In step S407, the second focus adjustment unit sets the traveling direction to a direction opposite from the end, and starts to move the focusing lens.

In step S405, if the condition is not satisfied (NO in step S405), the processing proceeds to step S406. The condition of step S406 is satisfied immediately after the minute driving operation transitions to the hill-climbing operation. In step S406, the second focus adjustment unit assumes the traveling direction in the minute driving operation and starts to move the focusing lens.

In step S408, the second focus adjustment unit determines whether the focusing lens has reached the ends a predetermined number of times. If the focusing lens at least has reached both ends of the search area without identifying the in-focus position, in the entire search range, the AF evaluation value may little change in like the area C of FIG. 11A.

In such a case, the in-focus position may be outside the search range of the focusing lens.

If the hill-climbing operation is continued in such a condition, large focus variations will be repeated. To avoid such a situation, if the condition of step S408 is satisfied (YES in step S408), the processing proceeds to step S409. In step S409, the second focus adjustment unit stops the focusing lens.

In step S410, the second focus adjustment unit sets the determination result of the hill-climbing operation to "not in focus," and sets the next state to transition, to the monitoring processing of the AF evaluation value. If the condition of step S408 is not satisfied (NO in step S408), the processing proceeds to step S411.

In step S411, the second focus adjustment unit compares the current AF evaluation value with the previous AF evaluation value to determine whether the current AF evaluation value is greater than the previous AF evaluation value. If the current AF evaluation value is greater than the previous AF evaluation value (YES in step S411), the processing proceeds to step S412. In step S412, the second focus adjustment unit sets the determination result of the hill-climbing operation to "continue," and continues to perform the processing of the hill-climbing operation.

In other words, if the tendency of the AF evaluation value to increase can be detected, like when the hill-climbing operation is properly performed in a direction toward the actual in-focus position in an area B of FIG. 11A, the second focus adjustment unit performs the hill-climbing operation in that direction.

In step S411, if the condition is not satisfied (NO in step S411), the processing proceeds to step S413. In step S413, the second focus adjustment unit determines whether the AF evaluation value decreases after reaching a peak. Specifically, such a situation arises, for example, when the hill-climbing operation is performed from an area B to the area A of FIG. 11A. If so (YES in step S413), the processing proceeds to step S414. In step S414, the second focus adjustment unit stops the focusing lens.

In step S415, the second focus adjustment unit sets the determination result of the hill-climbing operation to "in focus," and sets the minute driving operation as the next state to transition to. In step S416, the second focus adjustment unit moves the focusing lens to the peak position of the AF evaluation value. In step S413, if the condition is not satisfied (NO in step S413), the processing proceeds to step S417.

Specifically, for example, such a situation include a case when the hill-climbing operation is performed in a direction opposite from the in-focus position in an area B of FIG. 11A. In step S417, the second focus adjustment unit reverses the moving direction of the focusing lens and moves the focusing lens. In step S418, the second focus adjustment unit sets the determination result of the hill-climbing operation to "continue," and continues to perform the processing of the hill-climbing operation.

The processing of steps S408 to S418 detects a change in the periodically-obtained AF evaluation value and outputs the determination result of the hill-climbing operation based on the change. In step S419, the second focus adjustment unit performs the processing for determining a focus adjustment method based on the determination result. Details will be described below.

The hill-climbing operation of the image pickup apparatus 1 according to the exemplary embodiment of the present invention has been described above.

Figure 5:
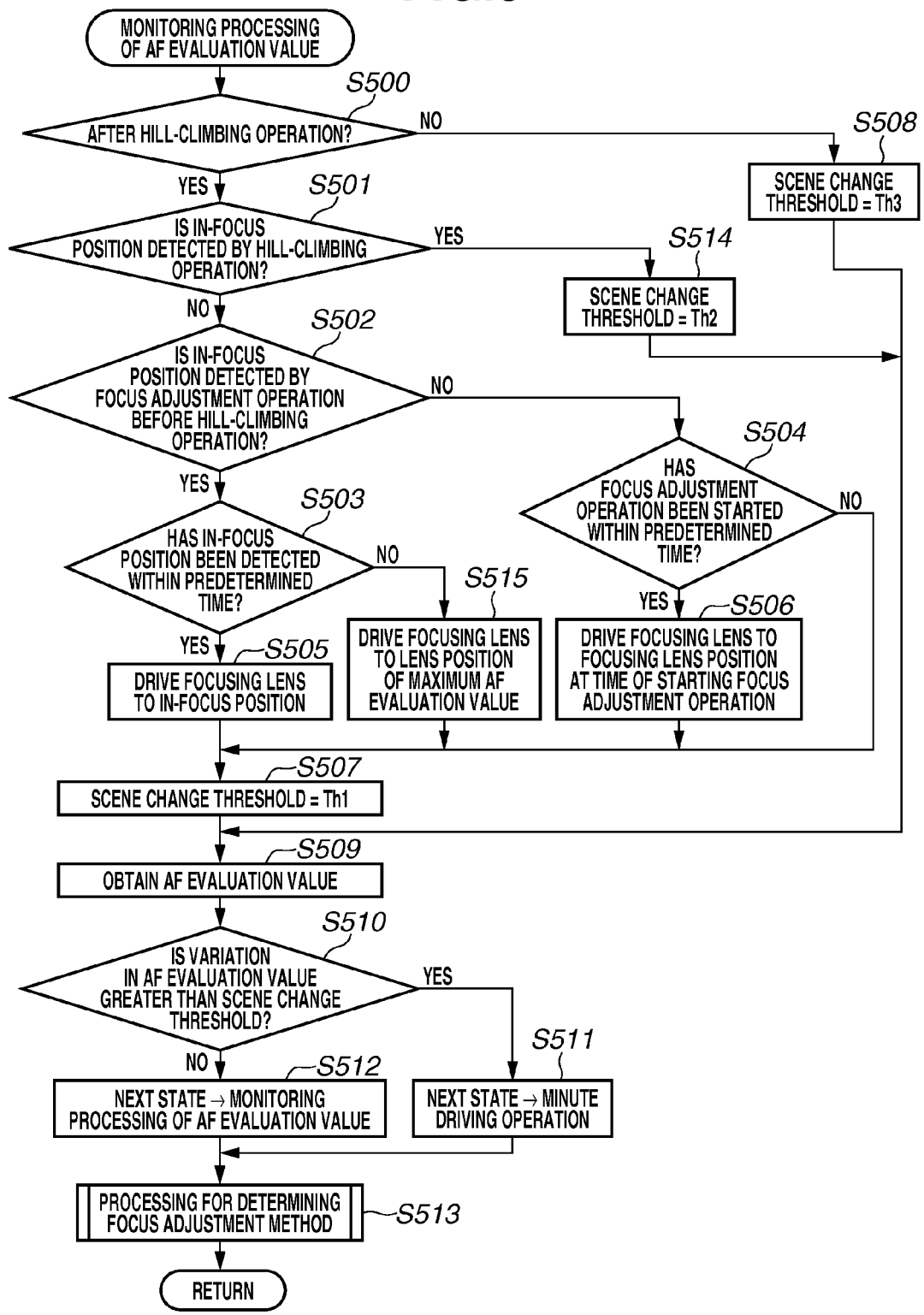
FIG. 5 is a flowchart illustrating a flow of monitoring processing of an automatic focusing (AF) evaluation value.

Next, the monitoring processing of the AF evaluation value will be described with reference to the flowchart of FIG. 5.

The monitoring processing of the AF evaluation value is processing for detecting whether the current AF evaluation value has changed from the previously-stored AF evaluation value. The monitoring processing is performed in a moving image capturing state.

In step S500, the system control unit 115 determines whether, in the current state, the hill-climbing operation has been performed. If the current state is such a state where the hill-climbing operation has been performed (YES in step S500), the processing proceeds to step S501. If not (NO in step S500), the processing proceeds to step S508. In step S501, the system control unit 115 checks whether the in-focus position is detected by the hill-climbing operation. If the in-focus position is detected (YES in step S501), the processing proceeds to step S514. If no in-focus position is detected (NO in step S501), the processing proceeds to step S502. In step S502, the system control unit 115 checks whether an in-focus position is detected by the focus adjustment operation before the hill-climbing operation is performed.

If the in-focus position is detected (YES in step S502), the processing proceeds to step S503. If no in-focus position is detected (NO in step S502), the processing proceeds to step S504. In step S503, the system control unit 115 determines whether the in-focus position is detected within a predetermined time with respect to the current time.

If the in-focus position is detected within the predetermined time (YES in step S503), the processing proceeds to step S505. In step S505, the system control unit 115 drives the focusing lens to the in-focus position previously detected. If the in-focus position is not detected within the predetermined time (NO in step S503), the processing proceeds to step S515. In step S515, the system control unit 115 drives the focusing lens to a lens position where the maximum AF evaluation value, among the AF evaluation values detected by the hill-climbing operation, is obtained.

Figure 2:
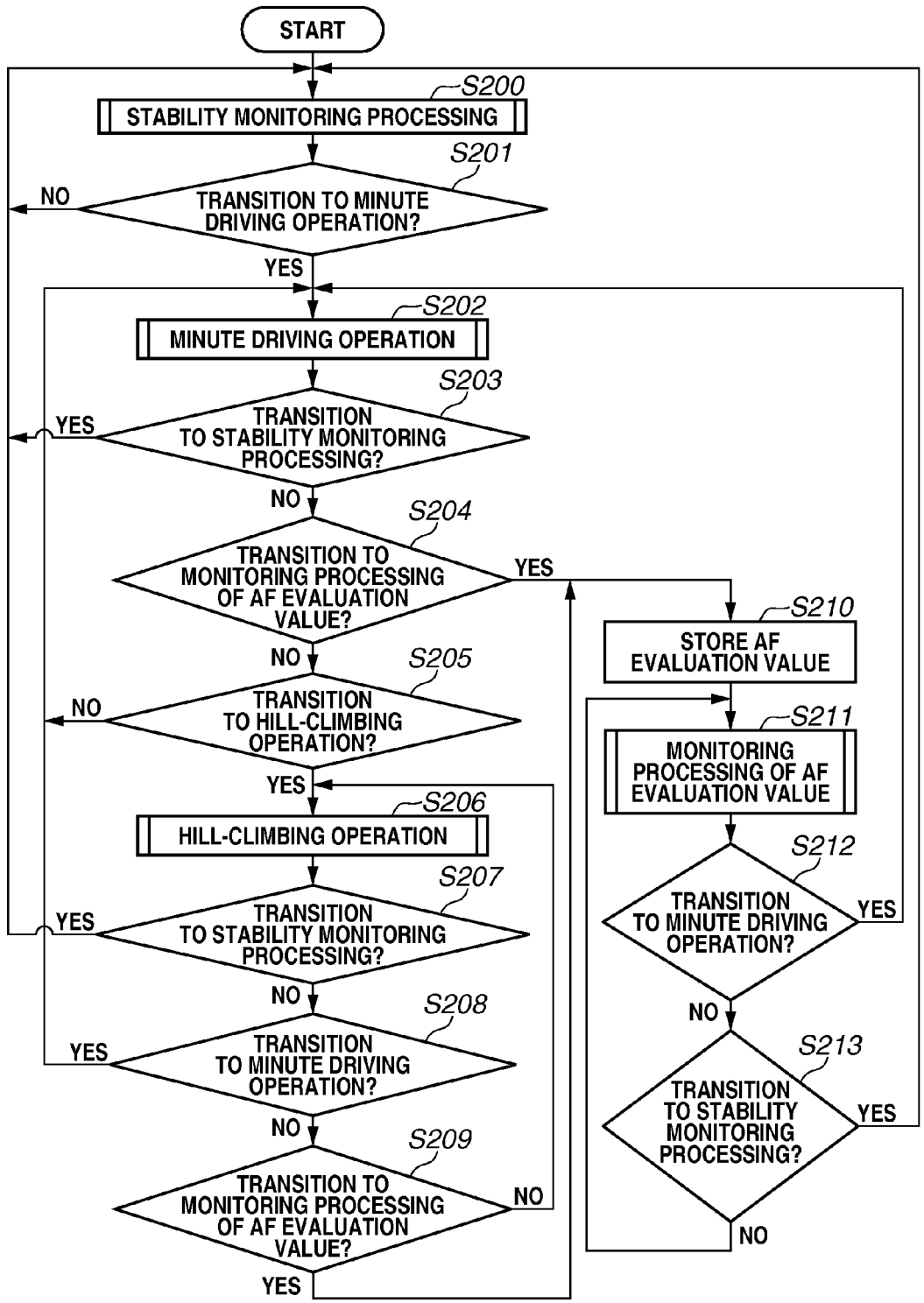
FIG. 2 is a flowchart illustrating an overall flow of a focus adjustment operation.

In step S504, the system control unit 115 determines whether the focus adjustment operation illustrated in FIG. 2 has been started within a predetermined time with respect to the current time. The threshold of the lapsed time in this determination may be the same as or different from the threshold of step S503. If the focus adjustment operation has been started within the predetermined time (YES in step S504), the processing proceeds to step S506. In step S506, the system control unit 115 drives the focusing lens to the focusing lens position when the focus adjustment operation is started.

The focusing lens position when the focus adjustment operation is started may be at a hyperfocal distance. A position obtained by a past focus adjustment operation may be used if any. If the focus adjustment operation has not been started within the predetermined time (NO in step S504), the processing proceeds to step S507. In step S507, the system control unit 115 sets a scene change threshold to Th1. The scene change threshold determines a scene change based a change amount of the AF evaluation value to be described below.

The hyperfocal distance is defined as hyperfocal distance=(focal length)$^2$/(aperture value×permissible confusion circle diameter).

The hyperfocal distance refers to a distance S beyond which a blurless image can be obtained up to an infinite distance if the camera lens is focused to the distance S.

In step S514, the system control unit 115 sets the scene change threshold to Th2. In step S508, the system control unit 115 sets the scene change threshold to Th3. Th1, Th2, and Th3 have a relation of Th1>Th2>Th3.

In other words, the predetermined threshold in the monitoring performed in an in-focus position not obtained by the second focus adjustment unit (hill-climbing operation) this time is set higher than that in the monitoring performed in the in-focus position obtained by the second focus adjustment unit this time.

The in-focus position in the monitoring performed in the in-focus position not obtained by the second focus adjustment unit (hill-climbing operation) this time is one previously obtained by the first focus adjustment unit (minute driving operation) or the second focus adjustment unit.

If the adjustment time taken to obtain the previous in-focus position has exceeded a predetermined time, the position of the focusing lens at the beginning of the moving image or the hyperfocal distance is used as the in-focus position in the monitoring performed in the in-focus position not obtained by the second focus adjustment unit this time.

The image pickup apparatus 1 may be configured to provide other thresholds than the three patterns of thresholds according to the motion of the object. For example, if the object makes a large motion, the in-focus position may be unable to be properly calculated. In view of this, a threshold Th4 tighter than Th1 may be further provided.

That is, if a monitoring unit performs image recognition of the object and the recognized object moves as much as or more than a predetermined amount, the monitoring state caused by the monitoring unit transitions to a focus adjustment state caused by the first focus adjustment unit (minute driving).

In such a case, the predetermined threshold in the monitoring performed in the in-focus position obtained by the second focus adjustment unit (hill-climbing driving) is set to be higher than the predetermined threshold in the monitoring performed in the in-focus position obtained by the first focus adjustment unit.

In step S509, the system control unit 115 obtains the AF evaluation value. In step S510, the system control unit 115 compares the AF evaluation value stored in step S210 of FIG. 2 with the latest AF evaluation value to determine whether a variation in the AF evaluation value is greater than the scene change threshold Th. If the AF evaluation value varies greatly (YES in step S510), the processing proceeds to step S511. In step S511, the system control unit 115 sets the minute driving operation as the next state to transition.

In step S510, if the AF evaluation value does not vary (NO in step S510), the processing proceeds to step S512. In step S512, to continue the monitoring processing of the AF evaluation value, the system control unit 115 sets the monitoring processing of the AF evaluation value as the next state to transition. In step S513, the system control unit 115 performs the processing for determining a focus adjustment method based on the determined next state to transition. Details will be described below.

As shown by the flow of the processing in steps S210 to S213 of FIG. 2, the monitoring processing of the AF evaluation value thus continues to be periodically performed if the AF evaluation value does not vary much and is stable.

If the focus evaluation value obtained by the system control unit 115 (monitoring unit) varies as much as or more than a predetermined threshold, the monitoring state caused by the monitoring unit transitions to the focus adjustment state caused by the first focus adjustment unit (minute driving).

In such a case, the predetermined threshold in the monitoring performed in the in-focus position obtained by the second focus adjustment unit (hill-climbing driving) is set higher than the predetermined threshold in the monitoring performed in the in-focus position obtained by the first focus adjustment unit (minute driving).

The monitoring processing of the AF evaluation value by the image pickup apparatus 1 according to the exemplary embodiment of the present invention has been described above. Such a control can be performed to suppress frequent hill-climbing operations and enable stable focus tracking.

The system control unit 115 functions as the monitoring unit that monitors whether the focus evaluation value varies as much as or more than a predetermined threshold in the in-focus position obtained by either one of the first and second focus adjustment units.

Figure 6:
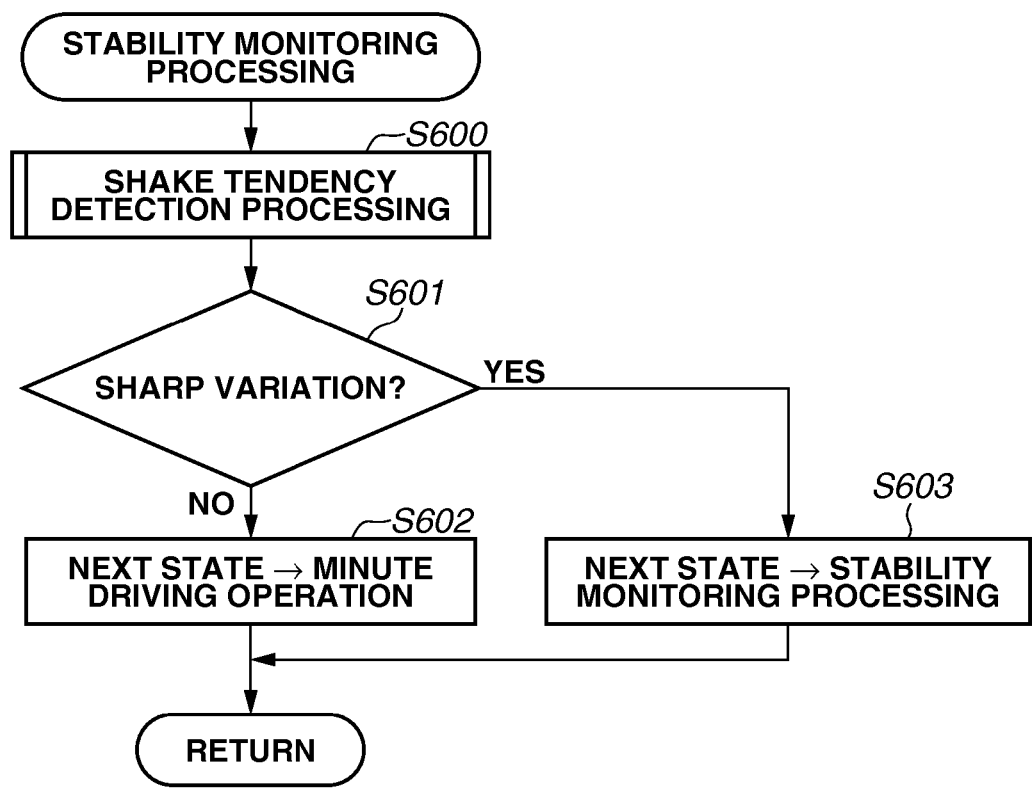
FIG. 6 is a flowchart illustrating a flow of stability monitoring processing.

Next, the stability monitoring processing will be described with reference to the flowchart of FIG. 6.

The stability monitoring processing refers to a state of checking the change tendency of a shake state and monitoring the change tendency until the image pickup apparatus 1 reaches a stable state.

In step S600, the system control unit 115 performs shake tendency detection processing. The shake tendency detection processing is processing for monitoring a change in the shake amount periodically obtained by the shake detection unit 121 and determining what state the image pickup apparatus 1 is in. Details will be described below.

In step S601, the system control unit 115 determines whether the current state includes a sharp variation based on the determination result of the shake tendency determination processing.

In step S601, if it is determined that the current state includes a sharp variation (YES in step S601), the processing proceeds to step S603. In step S603, the system control unit 115 sets the stability monitoring processing as the next state to transition to, and ends the processing.

In step S601, if the condition is determined to not be satisfied (NO in step S601), the processing proceeds to step S602. In step S602, the system control unit 115 sets the minute driving operation as the next state to transition to, and ends the processing. As shown by the series of processes in steps S200 and S201 of FIG. 2, the stability monitoring processing thus continues to be periodically performed unless the tendency of the shake reaches a somewhat stable state.

The reason is that if a sharp change of a shake occurs, the AF evaluation value can vary due to a shake of the image signal, and the focus adjustment operation may be unable to be properly performed.

The stability monitoring processing of the image pickup apparatus 1 according to the exemplary embodiment of the present invention has been described above.

Next, the shake tendency detection processing will be described with reference to the flowchart of FIG. 8 and FIGS. 9A and 9B.

The shake tendency detection processing is processing for monitoring a change in the shake amount periodically obtained by the shake detection unit 121 and determining what state the image pickup apparatus 1 is in.

In general, by making a determination based on the shake amount alone, only the intensity of a shake can be determined, for example, whether the shake is large or small. However, there can be various characteristics of shakes such as a gentle shake, a sharp shake, and a periodic shake, depending on the way of imaging by the photographer and the imaging situation.

The image pickup apparatus 1 includes the shake detection unit 121 for detecting a shake of the image pickup apparatus 1, and a shake change tendency detection unit for detecting a change tendency of the shake of the image pickup apparatus 1 based on an output of the shake detection unit 121.

In the present exemplary embodiment, when the monitoring unit detects that the focus evaluation value changes as much as or more than a predetermined threshold, if a shake amount output from the shake change tendency detection unit has a gradient greater than a predetermined value, the monitoring state caused by the monitoring unit is prevented from transitioning to the focus adjustment state caused by the first focus adjustment unit (minute driving).

More detailed detection and a feedback to the focus adjustment operation according to the situation is desirably performed to implement a more stable focus adjustment operation. In the present exemplary embodiment, a method for identifying two shake tendencies, a gentle change and a sharp change, will be described.

Figure 8:
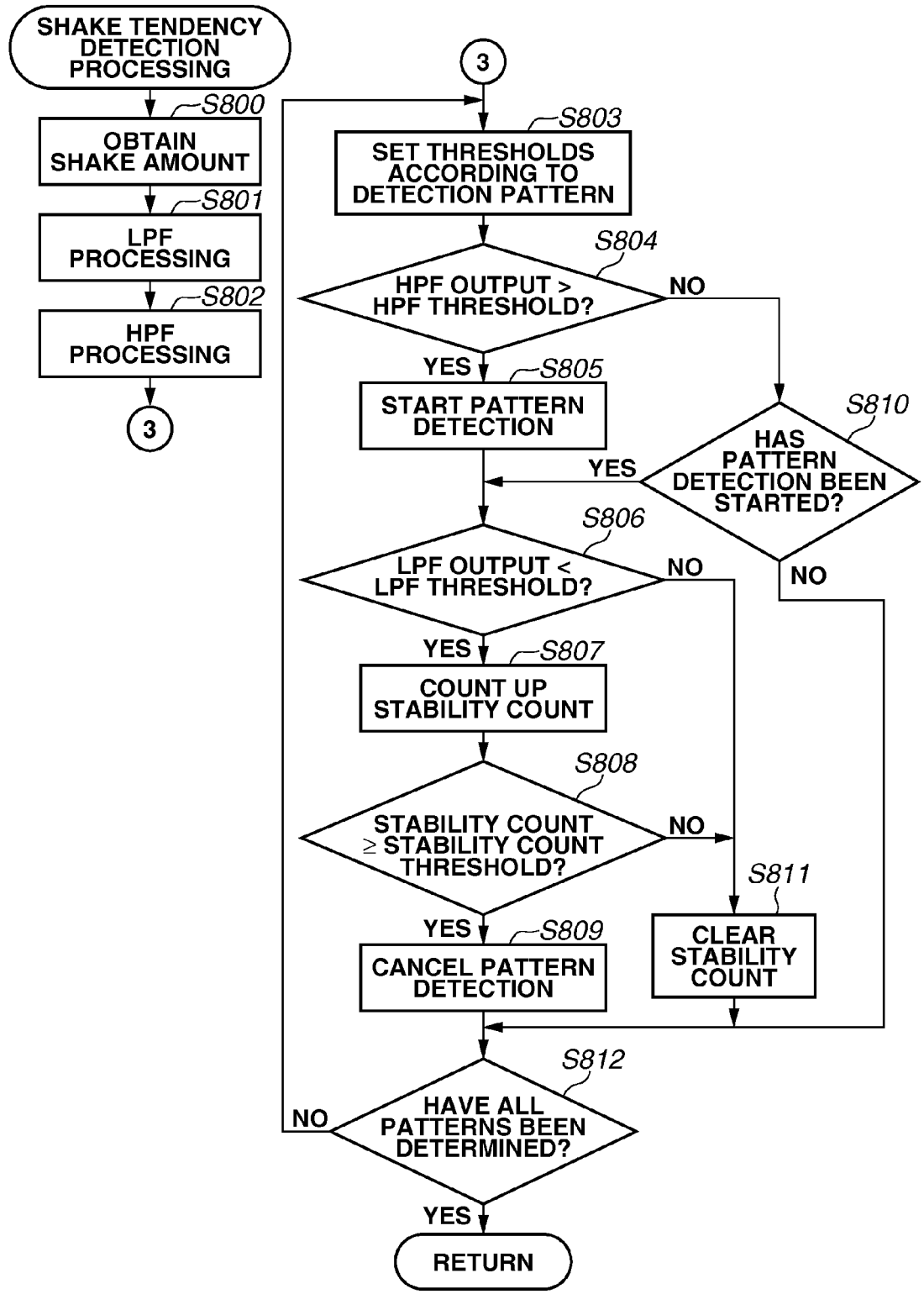
FIG. 8 is a flowchart illustrating a flow of shake tendency detection processing.

In step S800 of FIG. 8, the shake detection unit 121 obtains the shake amount. In step S801, the system control unit 115 performs LPF processing on the obtained shake amount. The shake amount obtained by the shake detection unit 121 may include variations due to noise. In step S801, the system control unit 115 therefore performs smoothing to facilitate extraction of the change tendency of the signal. In step S802, the system control unit 115 performs high-pass filter (HPF) processing.

Specifically, the system control unit 115 performs the HPF processing on the LPF output of the shake amount calculated in step S801. In the present exemplary embodiment, the HPF output is in an absolute value. The system control unit 115 can thus calculate the first order differential output (gradient) of the shake amount. In other words, in step S801, a smooth change in the shake amount can be extracted. In step S802, the change tendency of the shake, such as a gentle change or a sharp change, can be extracted.

In step S803, the system control unit 115 sets thresholds according to a detection pattern based on the outputs. The subsequent processing shall be performed by switching the thresholds (HPF threshold, LPF threshold, and stability count threshold to be described below) at the time of configuration determination according to a plurality of patterns to detect, based on an identical detection rule.

In step S804, the system control unit 115 compares the HPF output calculated in step S802 with an HPF threshold to determine whether the HPF output is higher than the HPF threshold. As described above, the HPF output indicates the gradient. The sharper the shake, the greater the value of the HPF output. The gentler the shake, the smaller the value of the HPF output. Based on such a characteristic, the system control unit 115 compares the HPF output with the HPF threshold set in advance to identify the tendency of the shake.

If the HPF output is higher than the HPF threshold (YES in step S804), the processing proceeds to step S805. In step S805, the system control unit 115 makes a setting to start pattern detection. In step S804, if the condition is not satisfied (NO in step S804), the processing proceeds to step S810. In step S810, the system control unit 115 determines whether the pattern detection has been started. If the pattern detection has been started (YES in step S810), the processing proceeds to step S806. If the pattern detection has not been started (NO in step S810), the processing proceeds to step S812.

In step S812, the system control unit 115 determines whether all patterns have been determined. If all the patterns have not been determined (NO in step S812), the processing returns to step S803. In step S803, the system control unit 115 switches the condition of the thresholds and continues the pattern determination again. If all the patterns have been determined (YES in step S813), the processing ends. In step S806, the system control unit 115 determines whether the LPF output is lower than the LPF threshold.

In such processing, the system control unit 115 determines whether the LPF output has decreased and the shake has stabilized. If the condition is satisfied (YES in step S806), the processing proceeds to step S807. In step S807, the system control unit 115 counts up a stability count which is provided for each detection pattern. The stability count is used to determine that the period of a small stable shake continues.

In step S806, if the condition is not satisfied (NO in step S806), the processing proceeds to step S811. In step S811, the system control unit 115 clears the stability count. The processing then proceeds to step S812. In step S808, the system control unit 115 determines whether the stability count is greater than or equal to the stability count threshold. Here, the system control unit 115 determines whether the state in which the LPF output is lower than the LPF threshold has lasted a predetermined number of times (=specific period).

If the condition holds (YES in step S808), the processing proceeds to step S809. In step S809, the system control unit 115 cancels the pattern detection. In step S808, if the condition is not satisfied (NO in step S808), the processing proceeds to step S812. In such a manner, the system control unit 115 starts pattern detection at a change of the HPF output, and ends the pattern detection if the LPF output has been stabilized for a predetermined number of times. The period from the start to the end is recognized as a state that indicates the change tendency of a predetermined shake.

The system control unit 115 can detect a plurality of change tendencies by returning the processing from step S812 to step S803, changing the thresholds, and performing the determination. FIGS. 9A and 9B illustrate examples of the change tendency of a shake detected by the shake tendency detection processing this time. FIG. 9A illustrates an example of a gentle change. FIG. 9B illustrates an example of a sharp change.

The LPF output and the HPF output vary according to the change tendency of the shake. To detect such variations, the HPF threshold, the LPF threshold, and the stability count threshold described above are set as illustrated in FIGS. 9A and 9B. The system control unit 115 thereby detects the change tendencies of two patterns of a shake, i.e., a gentle change and a sharp change.

The shake tendency detection processing according to the present exemplary embodiment includes only the processing of the flowchart illustrated in FIG. 8. Variations of the thresholds for detection can be increased to increase the patterns to detect.

Methods for detecting a change themselves can also be added to extract other change tendencies.

For example, whether a periodic increase and decrease of a signal of a predetermined level are occurring within a certain time, like those resulting from periodic shakes, may be detected.

If the image signal obtained from the imaging processing unit 109 is affected by a camera shake or panning, the movement amount of the object on the image signal is proportional to the focal length. Then, the zoom lens control unit 101 may calculate the focal length corresponding to the current zoom lens position so that various thresholds (HPF threshold, LPF threshold, and stability count threshold) in the shake tendency detection processing can be set with respect to each focal length.

The shake tendency detection processing of the image pickup apparatus 1 according to the exemplary embodiment of the present invention has been described above.

Figure 7:
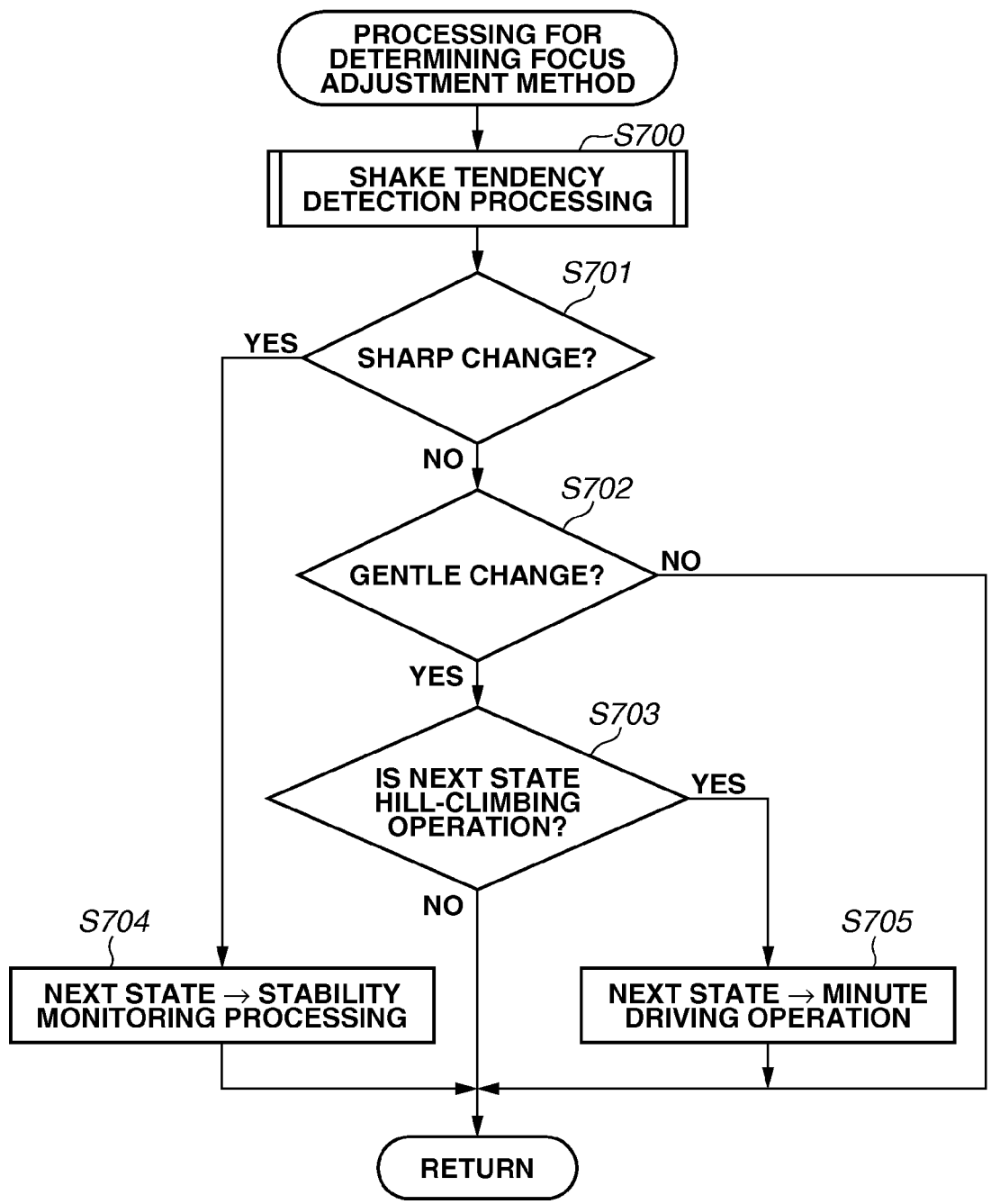
FIG. 7 is a flowchart illustrating a flow of processing for determining a focus adjustment method.

Next, the processing for determining a focus adjustment method will be described with reference to the flowchart of FIG. 7.

In the processing for determining a focus adjustment method, the focus adjustment method used in a focus adjustment operation is switched as appropriate according to the change tendency of the shake detected.

In step S700, the system control unit 115 performs the shake tendency detection processing. In step S701, the system control unit 115 determines the change tendency of the shake detected in step S700 to determine whether the change tendency of the shake is a sharp change. In step S701, if the condition is satisfied (YES in step S701), the processing proceeds to step S704. In step S704, the system control unit 115 sets the stability monitoring processing, as the next state to transition to.

In step S701, if the condition is not satisfied (NO in step S701), the processing proceeds to step S702. In step S702, the system control unit 115 determines whether the change tendency of the shake is a gentle change. In step S702, if the condition is satisfied (YES in step S702), the processing proceeds to step S703. If the condition is not satisfied (NO in step S702), the processing ends. In step S703, the system control unit 115 determines whether the next state to transition is the hill-climbing operation.

Figure 3:
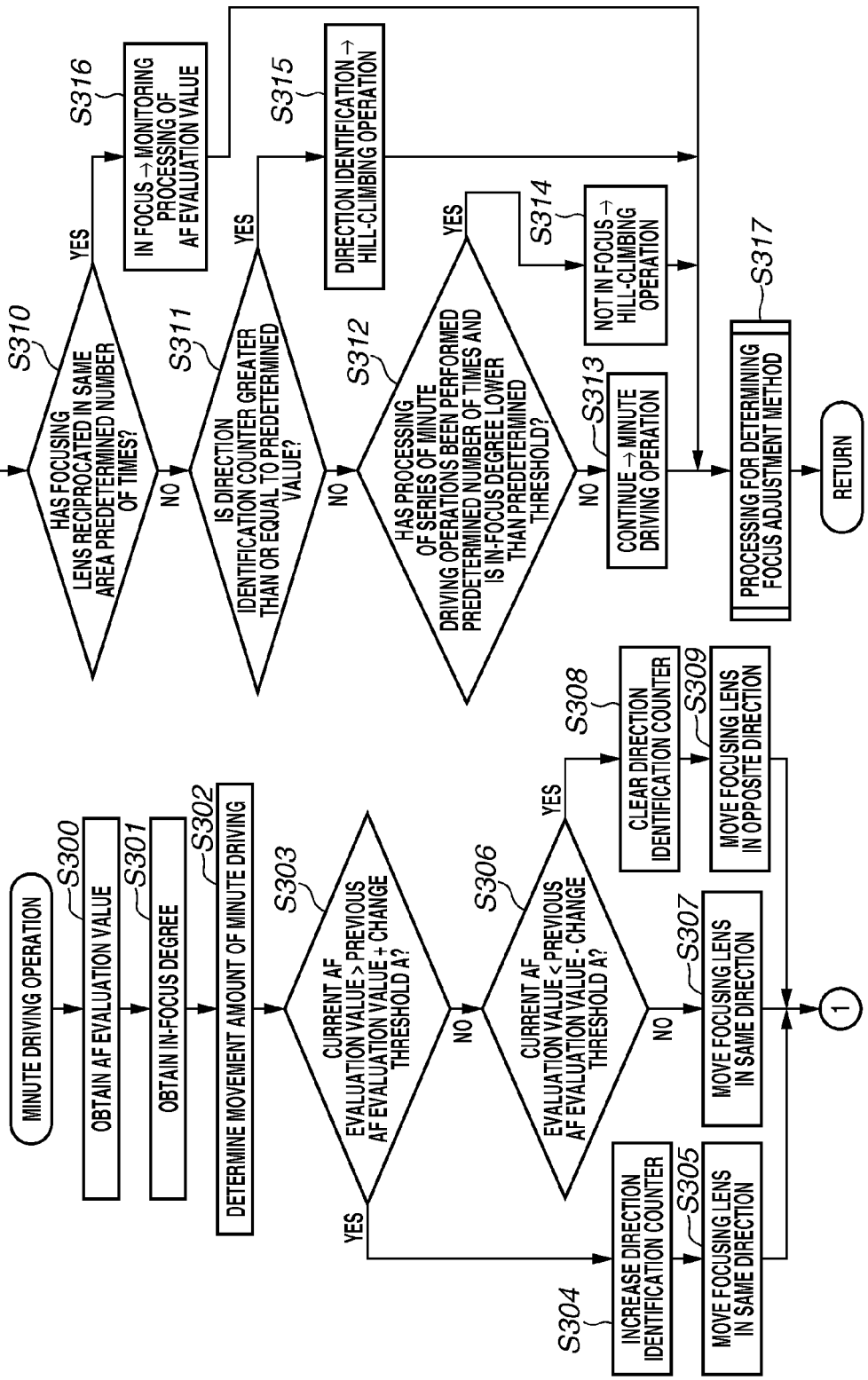
FIG. 3 is a flowchart illustrating a flow of a minute driving operation.
Figure 4:
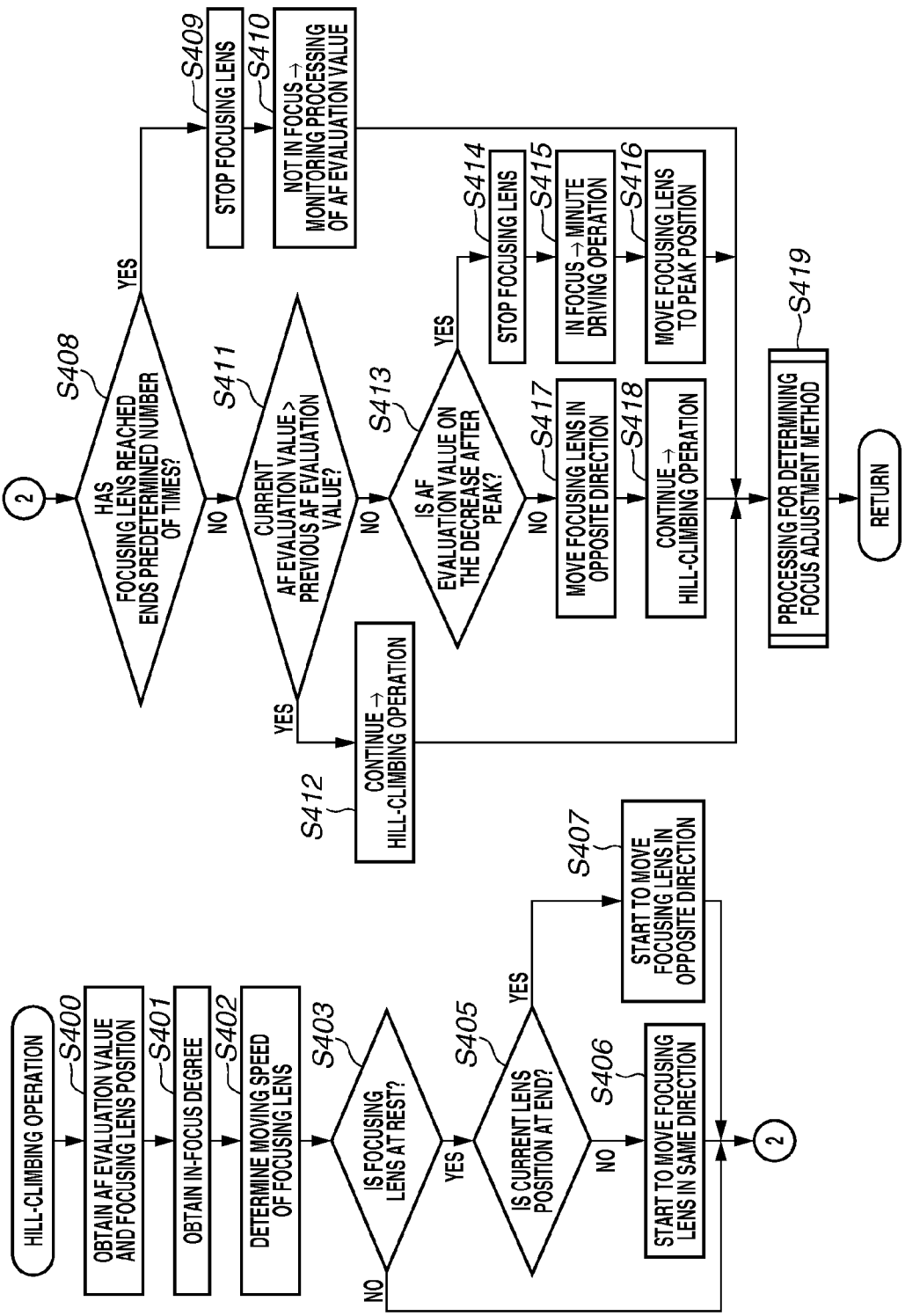
FIG. 4 is a flowchart illustrating a flow of a hill-climbing operation.

The processing for determining a focus adjustment method is performed at the end of the minute driving operation described in FIG. 3 or the hill-climbing operation described in FIG. 4. The next state to transition has been determined immediately before, according to the determination result of the respective operations. In step S703, the system control unit 117 therefore determines whether the previously-determined state is the hill-climbing operation. If the previously-determined state is the hill-climbing operation (YES in step S703), the processing proceeds to step S705. In step S705, the system control unit 115 re-sets the next state to transition, to the minute driving operation.

If the condition of step S703 is not satisfied (NO in step S703), the processing ends. That is, if the condition of step S702 or step S703 is not satisfied, the previously-determined state is simply reflected. In such a manner, the system control unit 115 updates the next state to transition, from the originally-intended state to another state according to the change tendency of the shake. The reason is that the susceptibility to the effect of a shake varies depending on the method of focus adjustment such as the minute driving operation and the hill-climbing operation.

More specifically, in the case of the minute driving operation where the in-focus position is identified based on a change in the AF evaluation value obtained by an intermittent lens movement, the in-focus position can be tracked only by decreasing a tracking speed even if affected by a certain amount of shake.

However, in the case of the hill-climbing operation where the in-focus operation is identified based on a change of a series of AF evaluation values obtained by a continuous lens movement, the effect of the shake comes directly to the surface as variations in the AF evaluation value. The in-focus position is thus likely to be erroneously identified and determined.

In view of such a difference in characteristic between the focus adjustment methods, in the processing for determining a focus adjustment method, an appropriate focus adjustment is selected in consideration of the change tendency of the shake.

The processing for determining the focus adjustment method of the image pickup apparatus 1 according to the exemplary embodiment of the present invention has been described above.

In an exemplary embodiment of the present invention, if the monitoring unit detects a change of the imaging scene, the monitoring state caused by the monitoring unit transitions to the focus adjustment state caused by the first focus adjustment unit (minute driving).

In such a case, the predetermined threshold in the monitoring performed in the in-focus position obtained by the second focus adjustment unit (hill-climbing driving) is set higher than the predetermined threshold in the monitoring performed in the in-focus position obtained by the first focus adjustment unit.

As has been described above, according to an exemplary embodiment of the present invention, even if an object leaves or enters the screen and the AF evaluation value does not show an expected change tendency, useless focus tracking can be avoided once a focus adjustment is performed. This enables stable focus tracking.

According to an exemplary embodiment of the present invention, the provision of the foregoing configuration enables stable focus tracking even if an object leaves or enters the screen and the AF evaluation value does not show an expected change tendency.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-145279, filed Jul. 15, 2014, which is hereby incorporated by reference herein in its entirety.

What is claimed is:

1. An image pickup apparatus comprising:
an image sensor;
a focus evaluation value calculation unit configured to extract a specific frequency component from an image signal output from the image sensor and calculate a focus evaluation value indicating contrast of the image signal;
a first focus adjustment unit configured to reciprocate a focusing lens by a unit movement amount smaller than a predetermined value and perform a focus adjustment based on a change in the focus evaluation value;
a second focus adjustment unit configured to, after the focus adjustment by the first focus adjustment unit, move the focusing lens in a direction which increases the focus evaluation value by a unit movement amount greater than or equal to the predetermined value and perform a focus adjustment based on a change in the focus evaluation value;
a monitoring unit configured to monitor whether the focus evaluation value changes as much as or more than a predetermined threshold in an in-focus position obtained by either one of the first focus adjustment unit and the second focus adjustment unit; and
a control unit configured to, if the focus evaluation value changes as much as or more than the predetermined threshold and a monitoring state caused by the monitoring unit transitions to a focus adjustment state, control the predetermined threshold in monitoring performed in the in-focus position obtained by using the second focus adjustment unit so that the predetermined threshold becomes greater than the predetermined threshold in a monitoring performed in the in-focus position obtained by the first focus adjustment unit without using the second focus adjustment unit.

2. The image pickup apparatus according to claim 1, wherein the predetermined threshold in the monitoring performed in an in-focus position not obtained by the second focus adjustment unit this time is greater than the predetermined threshold in the monitoring performed in the in-focus position obtained by the second focus adjustment unit this time.

3. The image pickup apparatus according to claim 2, wherein the in-focus position in the monitoring performed in the in-focus position not obtained this time by the second focus adjustment unit is one previously obtained by the first focus adjustment unit or the second focus adjustment unit.

4. The image pickup apparatus according to claim 2, wherein, if the adjustment time taken to obtain the previous in-focus position has exceeded a predetermined time, a position of the focusing lens at a time of starting to capture a moving image or a hyperfocal position is used as the in-focus position in the monitoring performed in the in-focus position not obtained by the second focus adjustment unit.

5. The image pickup apparatus according to claim 1, wherein the monitoring caused by the monitoring unit is performed in a moving image capturing state.

6. The image pickup apparatus according to claim 1, further comprising:
a shake detection unit configured to detect a shake of the image pickup apparatus; and
a shake change tendency detection unit configured to detect a change tendency of the shake of the image pickup apparatus based on an output of the shake detection unit,
wherein, when the monitoring unit detects that the focus evaluation value changes as much as or more than the predetermined threshold, and if a shake amount output from the shake change tendency detection unit has a gradient greater than a predetermined value, the monitoring state caused by the monitoring unit does not transition to a focus adjustment state caused by the first focus adjustment unit.

7. An imaging method comprising:
extracting a specific frequency component from an image signal output from an image sensor and calculating a focus evaluation value indicating contrast of the image signal;
reciprocating a focusing lens by a unit movement amount smaller than a predetermined value and performing a first focus adjustment based on a change in the focus evaluation value;
after the first focus adjustment, moving the focusing lens in a direction which increases the focus evaluation value by a unit movement amount greater than or equal to the predetermined value and performing a second focus adjustment based on a change in the focus evaluation value;
monitoring whether the focus evaluation value changes as much as or more than a predetermined threshold in an in-focus position obtained by either one of the first focus adjustment and the second focus adjustment; and
if the focus evaluation value changes as much as or more than the predetermined threshold and a monitoring state caused by the monitoring unit transitions to a focus adjustment state, controlling the predetermined threshold in the monitoring performed in the in-focus position obtained by using the second focus adjustment so that the predetermined threshold becomes greater than the predetermined threshold in the monitoring performed in the in-focus position obtained by the first focus adjustment without using the second focus adjustment.

* * * * *